Nov. 30, 1948. R. F. TATOM 2,454,894
HOOK
Filed Jan. 1, 1944
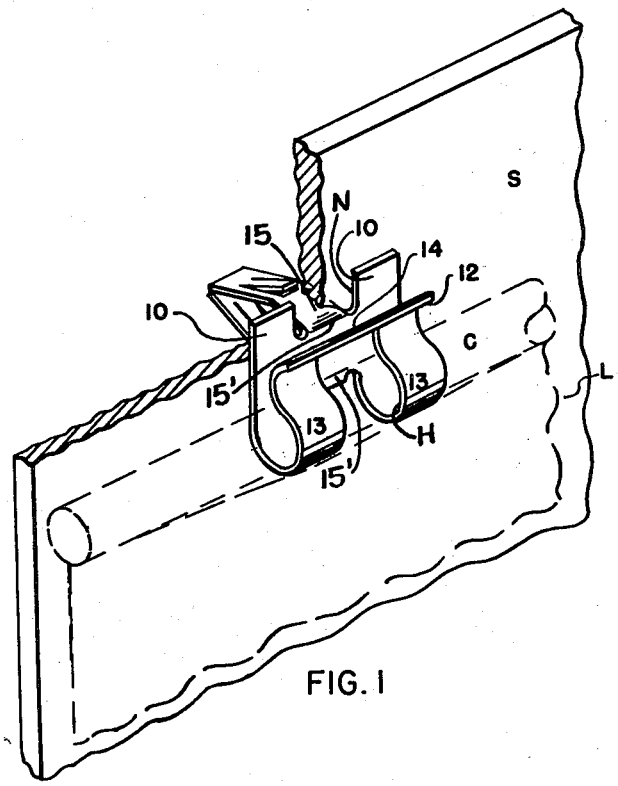
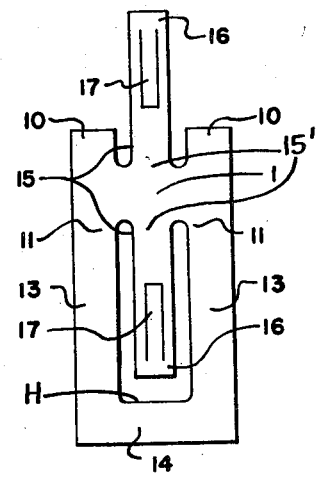
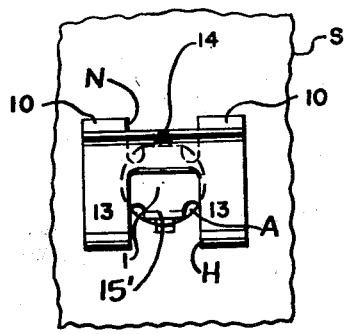
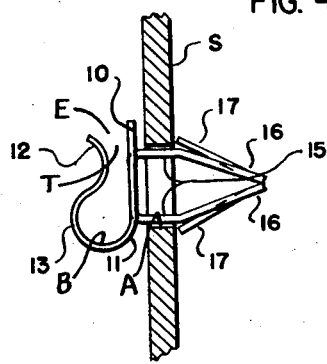
Inventor
RAYMOND F. TATOM
By Reynolds + Beach
Attorney Patented Nov. 30, 1948

2,454,894

UNITED STATES PATENT OFFICE 2,454,894

HOOK

Raymond F. Tatom, Seattle, Wash., assignor to Boeing Airplane Company, a corporation of Delaware Application January 1, 1944, Serial No. 516,739

5 Claims. (Cl. 24—73)

The hook of my invention is of the type which can be secured quickly to a supporting structure, and may be used as a hanger, for such purposes as attaching to that structure a sound deadening or insulating lining curtain, as employed, for example, in airplane fuselages.

My hook is particularly suitable for attachment to a metal backing sheet, and eliminates the use of rivet, bolt or screw fasteners, or other such devices requiring considerable time to install. Nevertheless when attached to the backing structure my hook is locked securely in place.

A principal object of my invention, therefore, is to provide a hook of the general type mentioned which is light and strong, preferably being made of sheet metal. This hook can be formed readily by stamping it from a single sheet, being of integral construction so that it is very economical to produce.

More specifically it is an object to provide such a hook which can be anchored securely in a hole in the backing structure. To mount the hook it is necessary merely to push its supporting portion through such hole, whereupon the hook will be locked automatically in place. Furthermore the article to be supported by the hook can be engaged with it quickly, and when it has been inserted it cannot be displaced from the hook inadvertently.

It is an additional object to form such a hook structure which will be exceedingly stable in that it has a surface of considerable effective area to bear against the backing structure, its attaching portion cannot tilt appreciably relative to the hole in which it is inserted, and the hook proper affords a broad bearing for the article which it supports. Moreover the hook supporting portion projects substantially centrally from the hook proper to eliminate, as far as possible, any tendency of the load carried by it to turn or to tilt the hook.

Additional objects are achieved by the specific construction of the hook and its supporting structure described in detail hereafter. The hook illustrated in the drawings is the form which I have found to be most suitable for accomplishing the results desired, but slight modifications might be beneficial for certain other uses.

Figure 1 is a top perspective view of my hook secured in a backing sheet and supporting an article to illustrate a typical use for the hook.

Figure 2 is a front elevation view of the hook by itself, and Figure 3 is a side elevation view of the hook as it would appear mounted on a backing sheet.

Figure 4 is a plan view of a blank perforated in the manner necessary for fabrication of my hook prior to its being formed.

A typical use for my hook, as mentioned, is to support a sound deadening or insulating lining, and this is the type of article shown carried by the hook in Figure 1. Such a lining drape or curtain L has a cord C passing through a hem in its upper edge and exposed for engagement with hooks at locations spaced apart corresponding to the spacing of the apertures A in the backing sheet S in which the hooks are inserted. These apertures may be of rectangular shape, but more conveniently are merely circular drilled holes.

The planar hook base plate 1, 10, 11 is preferably of H-shape, including base end strip portions 10, 11 and a central interconnecting strip portion 1 of the base formed integrally with such end strip portions. The effective length of the end strip portions is approximately two-thirds the length of the base parallel to the interconnecting strip portion, as shown best in Figure 2. The base end strip portions form spaced tabs 10 projecting beyond one edge of the base interconnecting central strip portion 1, and spaced shank portions 11 of a hook 12 projecting beyond the other edge of the interconnecting strip portion 1. This planar base portion can bear contiguously against the backing sheet S, and while all or most of the central interconnecting strip portion does not actually contact this sheet, because it lies opposite the receiving aperture A formed in the sheet, substantially covering such aperture, the engagement between these parts is widely distributed.

The curvated portion of the hook is formed in part by extensions of the end strip portions of the metal sheet folded generally parallel to the base plate 1, 10, 11. The hook shank and the major portion of the hook tip are thus divided, being formed of curved side strip portions 13 spaced apart edgewise, the ends of which are interconnected by a joining strip or bar 14, the three strips and the adjacent edge of base 1 thereby defining an aperture H in the hook proper. The hook tip is reversely curved to form a flaring entrance E between it and the base, and an adjoining restricted throat T substantially narrower than the trough or bottom portion B of the hook across the folding curve. The side strip portions 13 must therefore be sufficiently resilient so that when the cord C, or equivalent element, is being placed in the hook the side strip portions will flex thus spreading the throat for the cord to pass through it. When the cord is lodged in the bottom of the hook, therefore, side strip portions 13 will unflex to restrict the throat again, so that the cord will be forcibly retained in the hook against inadvertent dislodging displacement.

The supporting portion of the hook may be formed by two approximately parallel legs 15 comprising strip or tab elements projecting through the aperture A in sheet S, the parallel root portions 15' of which are integral with and disposed substantially perpendicular to the opposite edges of the interconecting strip portion 1 of the hook base. With the hook installed, beyond the face of the backing sheet S remote from the hook proper the end portions 16 of the legs are bent toward each other. The length of such leg portions and the degree they are bent are such that their free ends almost abut. Barbs 17 project outwardly from these bent leg portions to dispose their tips immediately behind the sheet S and radially outward of the circumference of hole A. These barbs engaging the back of such sheet serve to lock the hook in position against withdrawal.

When installing the hook and bent portions 16 are pressed through the aperture A in sheet S. Little effort is required for this operation, since the root portions of the legs 15 are substantially parallel before the hook is installed, and spaced apart a distance approximately equal to the width of the hole A. Radially outward, or expanding, pressure of the root portions of the legs is not relied upon to retain the hook positively in the hole. Rather a close fit of these portions in the aperture, in conjunction with the surface bearing of the hook base prevents appreciable tilting of the hook in any direction relative to the sheet S.

When the hook legs have been forced through the hole A sufficiently far to engage the hook base plate 1, 10, 11 with one face of the sheet S the barbs 17 have sprung outward adjacent to the opposite, back face of this sheet. Any attempt to withdraw the hook from the aperture, therefore, will press these barbs against the back of the sheet. This pressure tends to deflect the bent leg portions 16 toward each other, which merely presses their ends into mutual engagement to prevent further deflection after very slight withdrawing movement. Since the pressure on the barbs 17 is principally endwise they can not be bent outward readily. Consequently withdrawal of the hook is prevented until a sufficient force is exerted to break off at least one of the barbs, which requires a very large force.

It will be seen, therefore, that the installed hook is locked positively in the aperture A of the sheet S, so that even a very substantial force cannot remove it, although only a very slight effort is required to install it. Moreover at most only negligible tilting and movement of the hook axially of hole A are possible, although the installed hook may rotate more freely about the axis of the aperture if it is circular. If it is also desired to prevent appreciable turning the aperture can be of rectangular shape and of a width just slightly exceeding the width of legs 15. Also, as previously mentioned, the cord C or other element is held firmly in the hook against accidental displacement, and is engaged over a considerable extent lengthwise by the two curved side strip portions 13 in the hook's trough B₁.

Despite the advantages of easy, quick and secure installation discussed above the hook is of extremely light, strong and economical integral construction. The entire structure can be formed from a blank of the type shown in Figure 4. The parts of this blank bear numerals corresponding to the parts of the finished article, but it will be understood that, as illustrated, the blank has not as yet been bent to shape.

After the blank has been cut to sever one leg strip 15 from the tabs 10, and the other leg strip from the divided hook shank portions 11 and side strip portions 13, and the barbs 16 have been cut, it is merely necessary to bend the legs at two locations from the opposite edges of the central strip portion 1 of the hook base interconnecting the end strip portions. The root portions 15' of the legs 15 are bent perpendicular to the hook base plate, and the end portions 16 are bent inwardly through acute angles toward each other and relative to the root portions, at locations adjacent to the free ends of cut barbs 17. When thus bent, one leg leaves the notch N between the base end strip tabs 10 and the other is removed from the aperture H of the hook portion.

The hook proper is made by folding the remainder of the sheet, which is centrally apertured at H, to bend side strip portions 13, defining opposite sides of such aperture, toward the side of the base portion remote from the legs. The tip of the hook, including side strip portions 13 and bar 14, are reversely curved to form an S-shaped profile, of the shape shown in Figure 3. When the barbs 17 are bent outward slightly from the leg portions 16 the article is complete. It is pointed out that by bending the legs inwardly at points intermediate to the root ends and free ends of the barbs, instead of at the barb ends, the barbs would automatically project outwardly somewhat beyond the surfaces of the respective root portions of the legs for engagement with the sides of the aperture in the backing sheet.

It will be appreciated that the width of the interconnecting strip portion 1 of the base plate integral with legs 15 should be selected to correspond to the size of the aperture A in which the hook is to be installed, so that the legs when parallel will contact opposite edges of the hole, to assist in restraining tilting of the hook. Despite the cut-out between tabs 10, and the aperture bounded by portions 11, 13, 14 and the central strip portion 1 of the base plate, to supply material for forming the supporting legs 15, the hook is not weakened critically at any location. In fact, it is as effective for its purpose as though the base and hook portions were a continuous folded sheet and the legs were formed from additional material. Such a construction would perhaps actually be weaker, as well as heavier, because in that instance the legs would not be integral with the hook base, as they are in my hook, but would be attached in some other way.

I claim as my invention:

1. A hook comprising a substantially rectangular base plate, a hook portion on one side of said base plate and including two strips spaced edgewise and springing from one edge of said base plate, and two legs springing from points symmetrically arranged at opposite sides of a reference line on said base plate parallel to the edge from which said two hook portion strips spring, and located between parallel lines on the base plate perpendicular to such reference line and extending from the adjacent edges of said hook portion strips at their junctions with said base plate, said legs projecting beyond the side of said base plate opposite that on which said hook portion is located and parallel to a plane perpendicular to said reference line, said legs further having mutually convergent free end portions.

2. A hook comprising a generally H-shaped base plate including two spaced end strip portions and an interconnecting transverse strip portion, a hook portion on one side of said base plate and including two strips spaced edgewise and springing, respectively, from corresponding ends of said two base plate end strip portions, and two legs springing, respectively, from the opposite edges of said base plate transverse strip portion, projecting beyond the side of said base plate opposite that on which said hook portion is located and generally perpendicular to said base plate, each of said legs having a barb extending toward but stopping short of said base plate, the tips of said barbs being spaced substantially equal distances from said base plate.

3. A hook comprising a generally H-shaped base plate including two spaced end strip portions and an interconnecting transverse strip portion, a hook portion on one side of said base plate and including two strips spaced edgewise and springing, respectively, from corresponding ends of said two base plate end strip portions, and two legs springing, respectively, from the opposite edges of said base plate transverse strip portion, projecting beyond the side of said base plate opposite that on which said hook portion is located and generally perpendicular to said base plate, the portions of said leg strips adjacent to said base plate being of substantially equal widths, disposed in parallel, face-to-face registering relationship, and spaced apart a distance approximately equal to their width, the free end portions of said leg strips remote from said base plate being mutually convergent toward their tips and each having a barb projecting generally in continuation thereof toward but stopping a substantial distance short of said base plate, the tips of said barbs being spaced substantially equal distances from said base plate.

4. A blank of sheet material for being formed into a hook, comprising a planar, generally U-shaped portion, a strip interconnecting the sides of said U-shaped portion near to but spaced from their ends, in the plane of said U-shaped portion, and thereby defining an aperture between such strip and the sides and the base of said U-shaped portion, and a pair of strips extending in symmetrical arrangement oppositely from the side edges of said interconnecting strip and perpendicular thereto, in the plane of said U-shaped portion, one strip of said pair thereby being disposed in said aperture and parallel to the sides of said U-shaped portion in such aperture, and the other strip of said pair being disposed between, parallel to and projecting beyond the free end portions of the sides of the U-shaped portion.

5. The blank defined in claim 4, in which each strip of such pair has a U-shaped cut formed in it with the ends of such cut directed toward the free end of the strip in which it is formed.

RAYMOND F. TATOM.

REFERENCES CITED

The following references are of record in the file of this patent:

UNITED STATES PATENTS

| Number | Name | Date |
| --- | --- | --- |
| 1,978,501 | Meyer | Oct. 30, 1934 |
| 1,020,916 | Lanier | Mar. 19, 1912 |
| 2,055,442 | Jones | Sept. 22, 1936 |
| 2,059,049 | Smith | Oct. 27, 1936 |
| 2,128,005 | Lombard | Aug. 23, 1938 |
| 2,278,691 | Cotter | Apr. 7, 1942 |
| 2,347,234 | Allen | Apr. 25, 1944 |